Feb. 26, 1924. 1,484,869
H. G. BRANDWEIN
APPARATUS FOR FILLING MATTRESSES
Filed June 29, 1922 9 Sheets-Sheet 1

Witnesses:
Harry R. L. White
W. F. Kilroy

Inventor
Henry G. Brandwein
By [signature] Attys

Feb. 26, 1924.

H. G. BRANDWEIN

APPARATUS FOR FILLING MATTRESSES

Filed June 29, 1922    9 Sheets-Sheet 5

1,484,869

Feb. 26, 1924.

H. G. BRANDWEIN

APPARATUS FOR FILLING MATTRESSES

Filed June 29, 1922   9 Sheets-Sheet 9

1,484,869

Witnesses:
Harry W. White
W. P. Kilroy

Inventor
Henry G. Brandwein
By Hiee & Hiee
Attys.

Patented Feb. 26, 1924.

1,484,869

UNITED STATES PATENT OFFICE.

HENRY G. BRANDWEIN, OF CHICAGO, ILLINOIS.

APPARATUS FOR FILLING MATTRESSES.

Application filed June 29, 1922. Serial No. 571,657.

*To all whom it may concern:*

Be it known that I, HENRY G. BRANDWEIN, a citizen of the United States, residing at Chicago, in the county of Cook and State of Illinois, have invented certain new and useful Improvements in Apparatus for Filling Mattresses, of which the following is a description.

My invention relates to that general class of devices for filling mattresses, cushions or the like, and relates particularly to a device adapted for filling intertufted mattresses, compartment mattresses or the like, the same being particularly adapted to fill that type of mattress in which the tick is provided with strips or the equivalent, forming an inner tufting, the filling material being inserted after the ticking and inner tufting are made up. The invention has among its objects the production of apparatus of the kind described which is simple, compact, durable, efficient and easily handled, and which may be employed for filling any type of mattress to which it is adapted. Many other objects and advantages of the construction herein shown and described will be obvious to those skilled in the art from the disclosure herein given.

To this end my invention consists in the novel construction, arrangement and combination of parts herein shown and described, or uses mentioned.

In the drawings, wherein like reference characters indicate like or corresponding parts.

Fig. 14 is a view of another type particularly adapted to be used with kapoc filling.

Referring to the drawings, in which my apparatus is shown, it may be mentioned that I have shown a table adapted to accommodate two molds, it being understood, however, that the table may be adapted to accommodate one or more. In order that the device itself may be understood, I will mention that the mattress cover or tick consists of the usual box shaped bag in which upper and lower sheets or face sheets are connected together at intervals or points so as to provide an inner tufting, or they may be connected by partitions forming compartments. Of course, the whole mattress might be a single compartment, or the filling may be inserted side by side or in sections, even though the mattress may be later tufted. The present apparatus is intended to fill the mattress and permit the easy insertion of one or more sections of filling, regardless of the mattress construction itself. It may be mentioned in addition that the filling, as will be hereinafter described, is compressed in a suitable mold and then the same discharged from the mold into the mattress.

Figures 7, 12, 13:
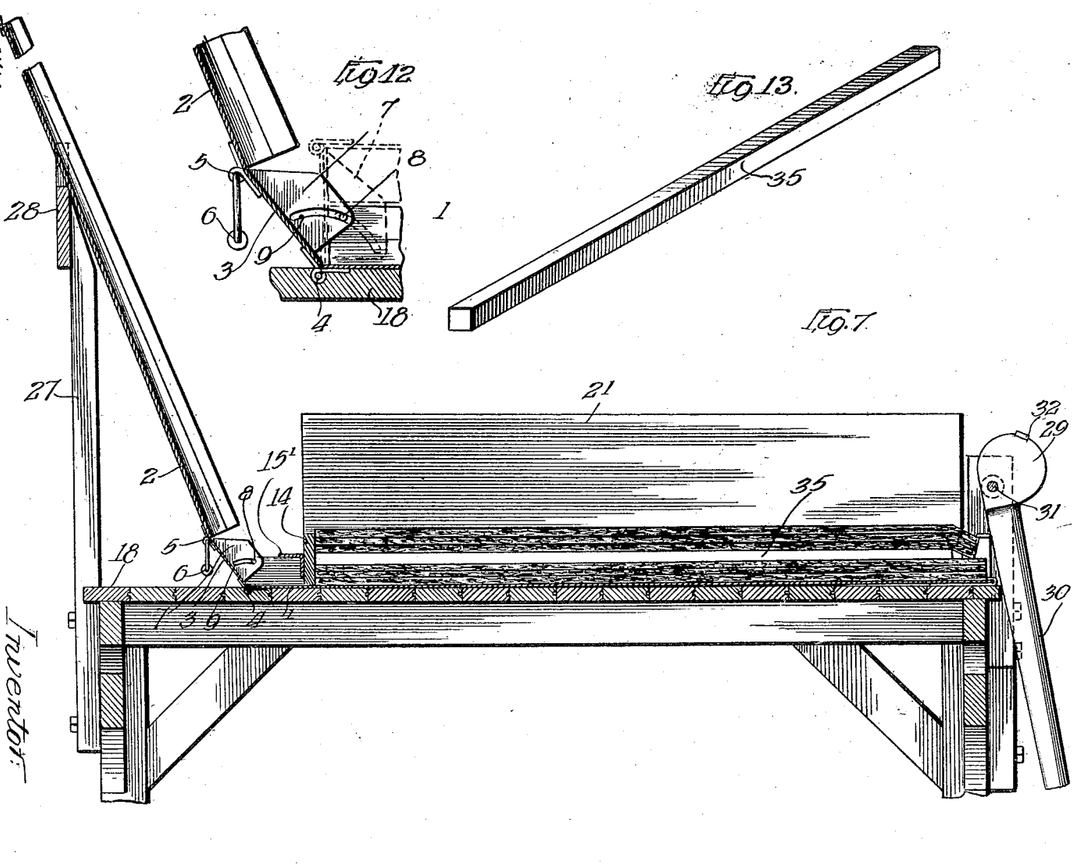
Fig. 7 is a longitudinal sectional view through the table and mold, the mold open.
Fig. 12 is an enlarged view of the hinged end mold, corresponding with Fig. 7, and in the dotted lines with Fig. 8.
Fig. 13 is a perspective view of one of the removable stiffeners.
Figures 8, 9, 10, 11:
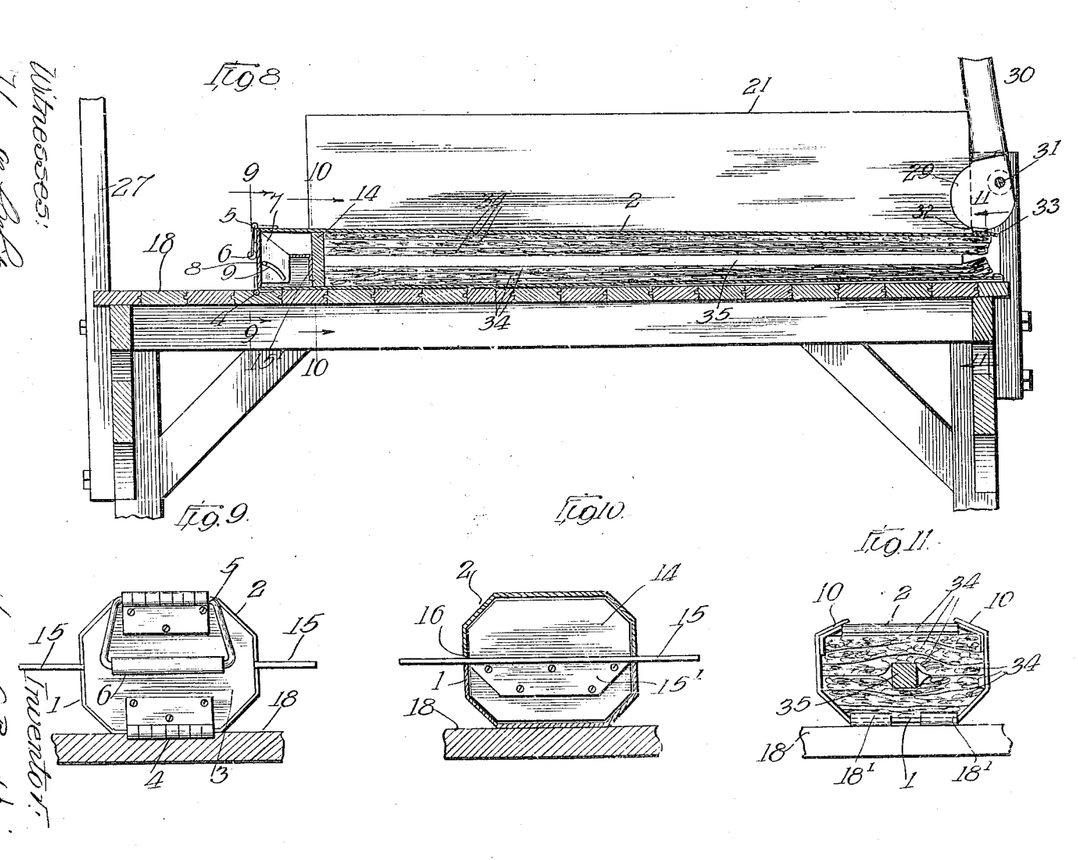
Fig. 8 is a similar view showing the mold closed and the filling compressed.
Fig. 9 is an end elevation of the mold.
Fig. 10 is a sectional view taken substantially on line 14—14 of Fig. 8.
Fig. 11 is a sectional view taken substantially on line 11—11 of Fig. 8.

Referring first to Figs. 2, 7 and 9 to 12, 1 and 2 represent mold halves which are preferably connected by an end plate or member 3. As shown, the same constitutes substantially a double hinge, as the same is pivotally secured to section 1 at 4 and to section 2 at 5, so that the parts may be opened up as shown in Fig. 7. This construction also permits a slight relative lengthwise movement of the two parts in closing and opening the whole, as will be hereinafter described. The handle 6 is also preferably provided for convenience in opening the whole, as will be hereinafter described.

As most clearly shown in Fig. 12, the plate 3 is provided with side wings or flanges 7, and with slots 9 arranged to cooperate with pins 8 on one of the mold parts, as shown, part 1. The free end of one part, as shown part 1, is provided with extending parts 10 arranged to engage the free end of the other mold part so that the two sections may be locked together when section 2 is pressed down and thence moved slightly lengthwise under the portion 10. To release the parts at their free ends it is merely necessary to pull the part 2 rearwardly, whereupon the opposite end will be released so as to permit the discharge of the filling.

Arranged within the mold sections is what might be termed a plunger plate 14, which I prefer to provide with some suitable operating means, as shown handles 15, which project beyond the sides of the mold at a space 16 therebetween or through slots in one of the mold parts. As shown, the plate 14 substantially loosely fits the mold sections so that it will not bind, and the handle portion 15 may be formed with the flange 15' for convenience in securing the handle to the plate 14.

Any suitable type of table or bench may be employed for supporting the mold during the filling and compressing of the same, a very simple construction comprising a table of the type illustrated and of the desired size and height. The particular table shown is adapted for the handling of two molds. As shown, the same is provided with a top 18, upon which the molds may be laid during the filling.

Figures 5, 6:
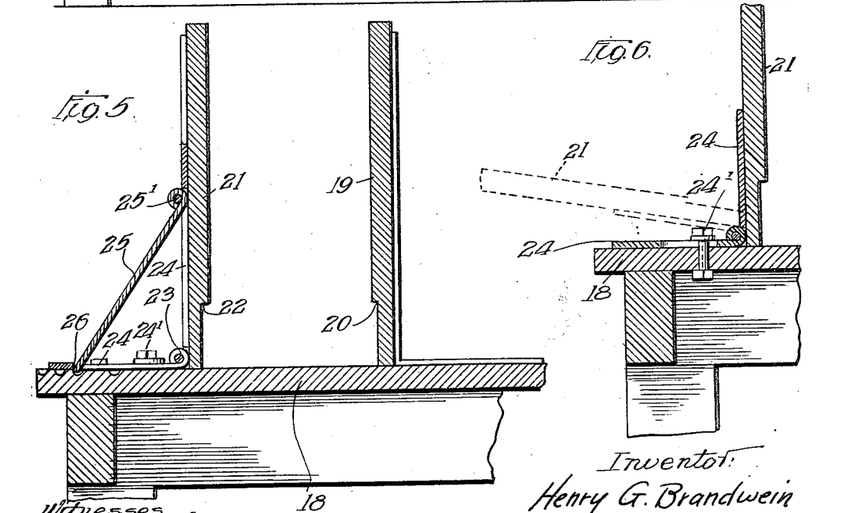
Fig. 5 is a sectional view taken substantially on line 5—5 of Fig. 3.
Fig. 6 is a sectional view taken substantially on line 6—6 of Fig. 3.

To facilitate the filling of the mold the table shown is provided with boards 19 and 21 of the desired size, shape and material. These may be mounted upon the table in any suitable manner, and in the construction illustrated one is made adjustable relative the other and also so that it may be turned down in placing or removing the mold before or after filling and compressing. As shown the side board 19 is mounted on the table, and the side board 21 is hinged to the table and is also transversely adjustable thereon, so that it may be moved to fit a mold of any particular width. Preferably the same are cut back or shouldered as indicated at 20 and 22, so as to substantially fit over the top edge of the lower part or section of the mold. As shown, 24—24 represents a hinge and 23 the pivot. One leg portion of the hinge may be secured directly to the board, while the other portion of the hinge, as shown, I prefer to adjustably secure to the table 18. I have shown a brace 25 pivotally secured at 25' to the side board and arranged at the other end 26 to engage a portion of the table. To drop the board at the time of placing or removing the mold, the brace 25 is merely raised at the free end and the side board dropped down, as indicated in the dotted lines of Fig. 6, while to lock it in place it is only necessary to raise it and engage the brace 25 with the table.

Figures 1, 2:
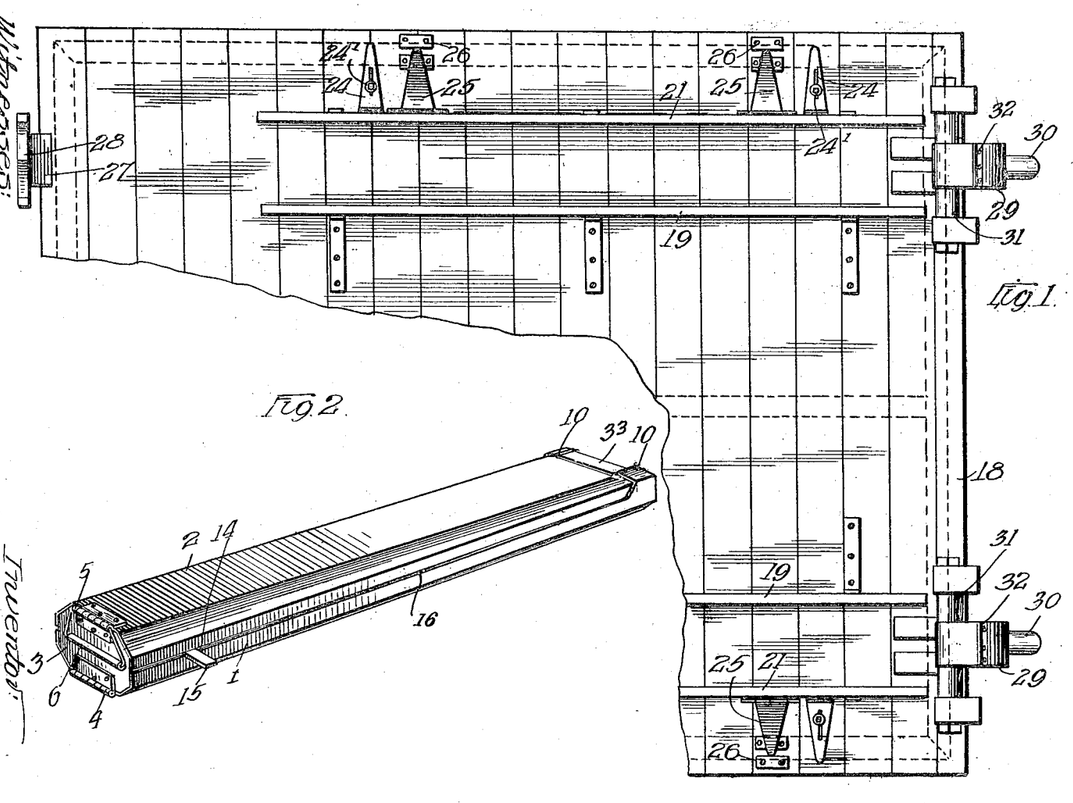
Fig. 1 is a plan view of a table adapted to be employed in cooperation with my improved mold.
Fig. 2 is a perspective view of the mold closed.
Figures 1A, 3:
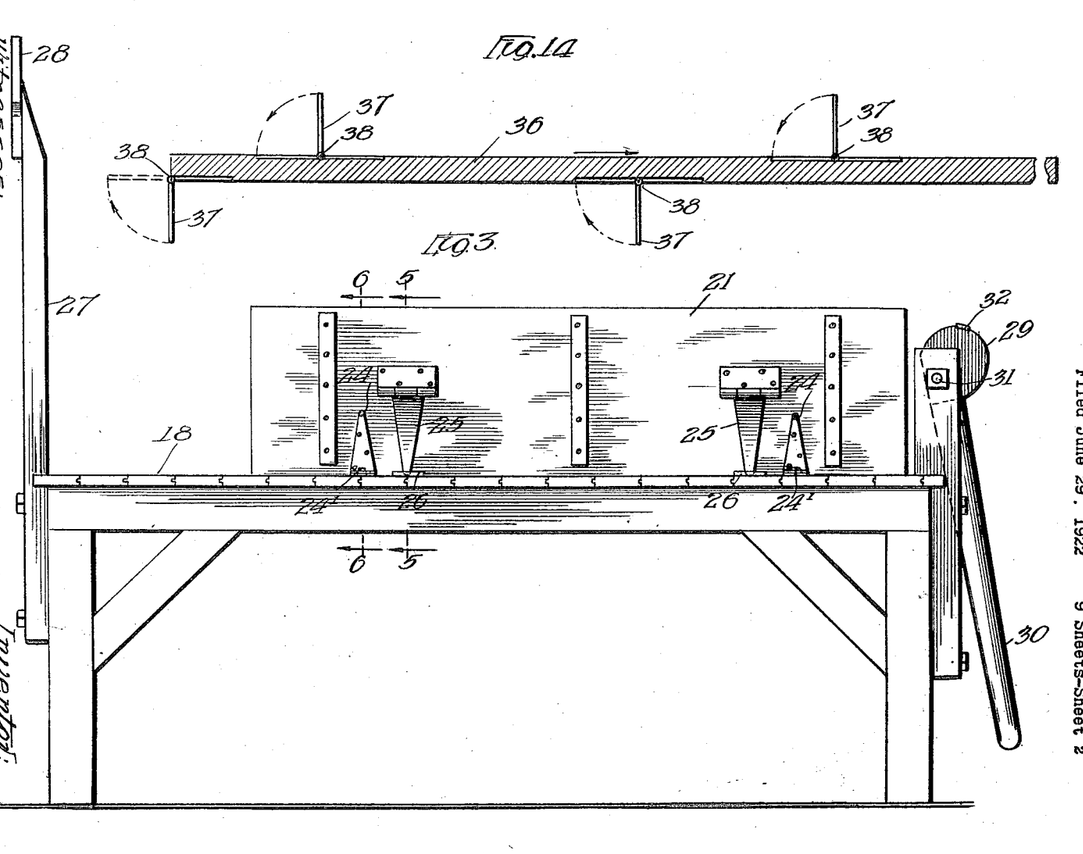
Fig. 3 is a side elevation of the table.
Figure 4:
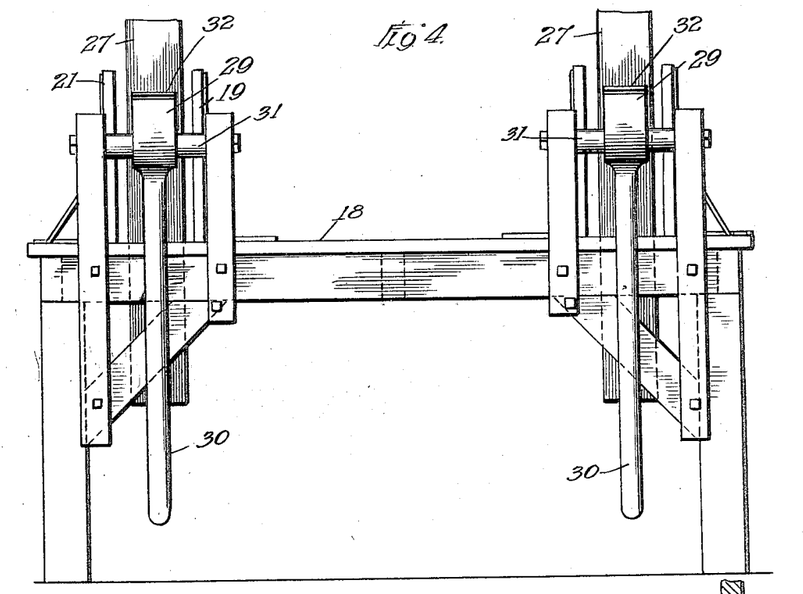
Fig. 4 is an end elevation.

As was before mentioned, it is desirable to compress the filling in the mold by pressing the part 2 down on the filling and thence moving it slightly lengthwise to engage the free end under the parts 10. I have illustrated in Figs. 3 and 7 a simple apparatus for this purpose. This consists of a cam member 29 provided with an operating handle 30 and pivotally secured at 31. It is immaterial as to whether the handle is to be raised or lowered, but generally it is preferred to arrange it substantially as shown.

In the particular machine illustrated the cam is provided with a shoulder, for example a plate 32, arranged to engage a shoulder 33 (see Fig. 7) or a small flange on the end of part 2, so that when the handle is raised after the part 2 is dropped down, the cam will tend to depress the part 2 and force it down below the level of the engaging parts 10, at which time the projecting part 32 will engage 33, and upon continued movement of the handle 30 will move part 2 lengthwise under parts 10, thereby securing the parts 1 and 2 together.

The filling material 34 may be felt, kapoc, or any suitable material for the purpose. In the case of felt, which usually is cotton felt, the same is brought to the mold in sections of the desired length, width and thickness. The desired number of sections are laid on the mold, the part 2 being raised, as shown in Fig. 7. In most cases I prefer to lay a stick or bar 35 substantially in the center of the charge of material, which tends to stiffen the charge. The mold after opening is withdrawn from the mattress. The stick may then be readily removed lengthwise from the filling.

In the case of kapoc or any material, which is not carded or felted but is loose or may be fluffy, I generally prefer to use a stick or bar similar to that shown in Fig. 14 of the desired size, shape and length. In this case, the rod or bar 36 is provided with members 37, which may be pivoted thereto, as indicated at 38. These members are opened, as indicated in Fig. 14, when the stick is placed, and when the mold is withdrawn the plunger prevents the stick from moving and the stick in turn prevents backward movement of the filling. However, after the mold has been entirely removed, the stick may be grasped and moved lengthwise, for example as indicated by the arrow in Fig. 14, but the same does not have enough friction to withdraw the kapoc or the like material, and movement of the stick tending to swing the members 37 as indicated in the dotted lines, closing them and thereafter permitting easy withdrawal of the stick. At all times in filling the mattress the mold is inserted in the compartment or in the mattress itself in the section desired, and the part 2 moved slightly backward so as to release the free end while at the same time the outward pressure of compressed material opens the free end to the extent that the mattress or tick will permit. The plunger is then held relative to the tick preventing rearward movement of the stick and the mold withdrawn until the plunger is adjacent the free or unhinged end of the mold. The mold and plunger are then withdrawn together.

After the mold has been entirely removed, however, the stick may be withdrawn. The plunger prevents the withdrawal of the charge from the mattress during the initial withdrawal movement of the mold, but, of course, after the mold is partially removed, the friction of the released filling on the tick will assist the plunger in holding the charge in the mattress and finally retain it, until the mold has been completely removed.

Figure 15:
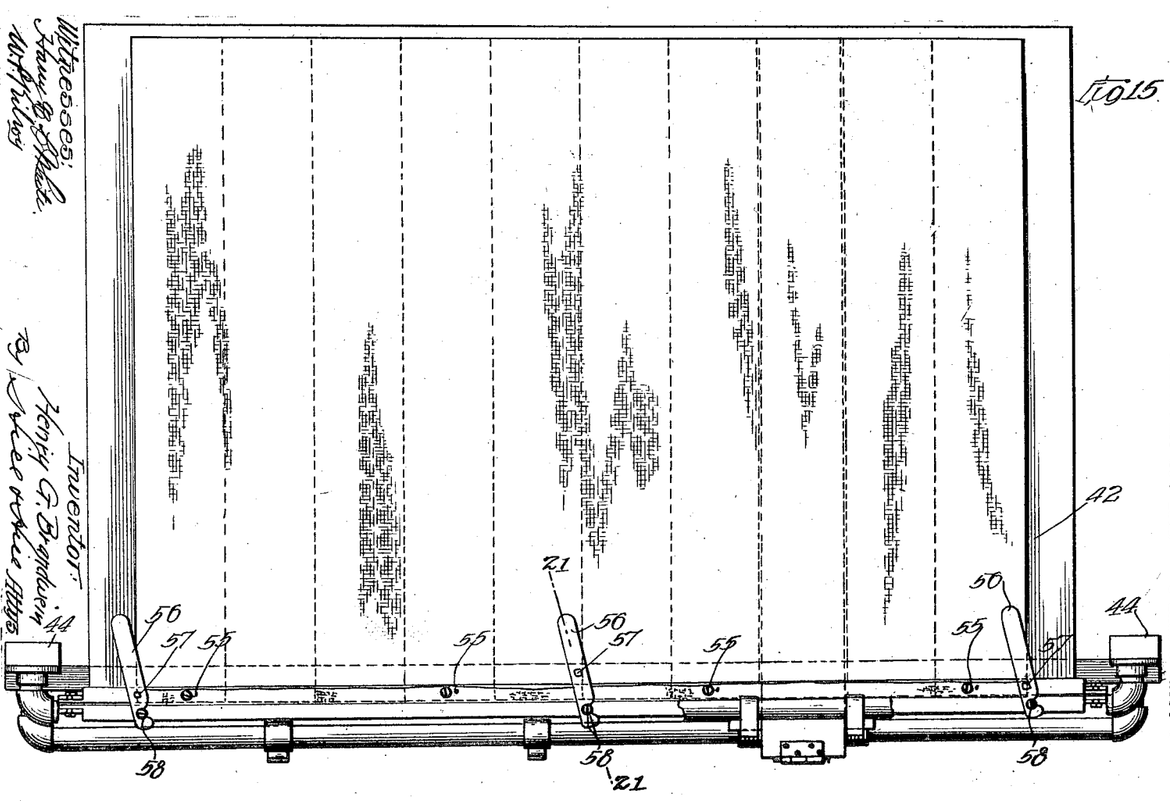
Fig. 15 is a top plan view of the filling table.
Figures 19, 20, 21, 22, 23:
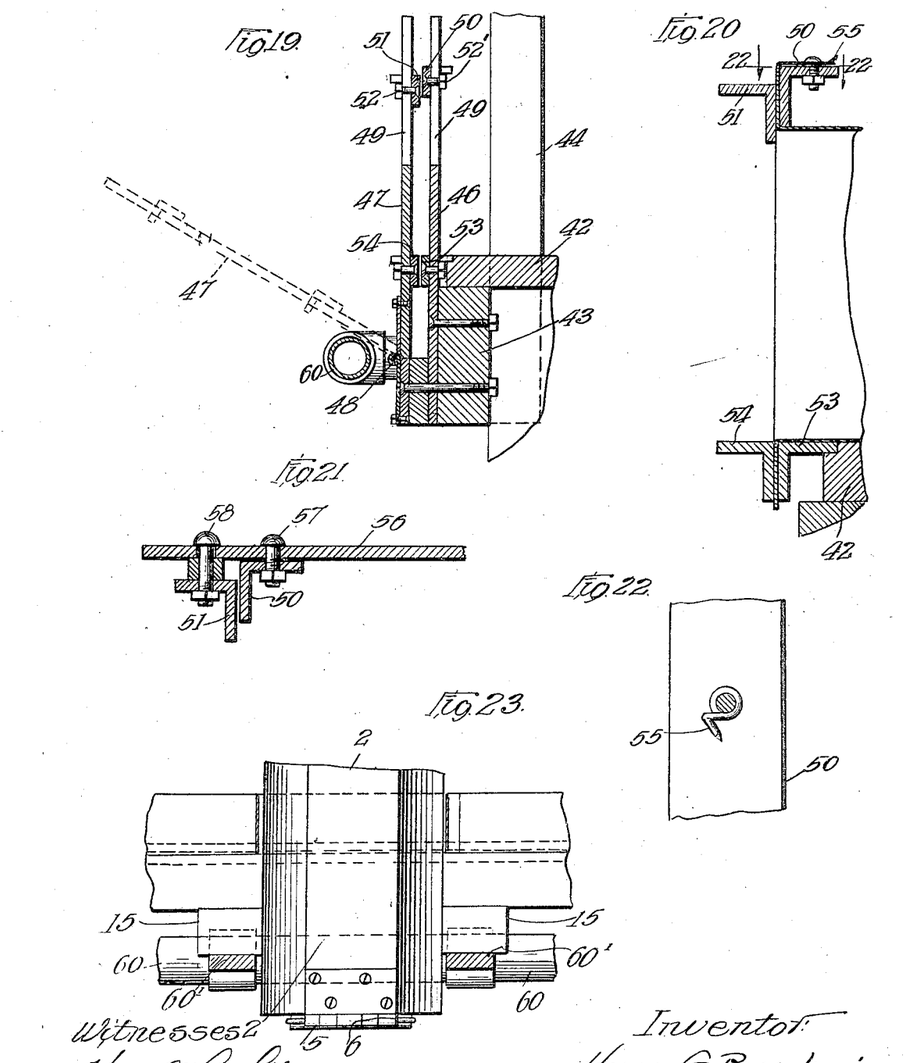
Fig. 19 is a section taken substantially on the line 19—19 of Fig. 16.
Fig. 20 is a section taken substantially on the line 20—20 of Fig. 16.
Fig. 21 is a section taken substantially on the line 21—21 of Fig. 15.
Fig. 22 is a section taken substantially on the line 22—22 of Fig. 20.
Fig. 23 is a section taken substantially on the line 23—23 of Fig. 16.

In Figs. 15 and 23 I have illustrated views of the filling table, that is, the table upon which the mattress is placed and carried during the steps of filling. Referring to these figures, 41 represents the mattress, which may be of suitable material of the desired size, style and construction. As shown, the same consists of top and bottom cover sheets connected at one side to its two ends, while the other side is open for the insertion of the filling, the same being sewed up after the mattress has been filled. In the particular mattress shown, the top and bottom sheets of the same (see Fig. 16) are connected by straps 41' arranged in alignment or by partitions or the like, the same substantially constituting an inner tufting. The machine shown is designed to support the mattress as it is being made, and also hold the edges at the open side for the easy insertion and withdrawal of the mold previously described.

As shown, the table consists of a top 42, suitably supported and provided with cooperating frames for clamping the edges of the mattress at the open side. The table illustrated is provided with a cross member 43 and upright members 44. Carried by the cross member 43 are uprights 46 and 47, 47 being preferably hinged, as indicated at 48. These two members are slotted, as indicated at 49, and carry bars 50 and 51, which I prefer to adjustably secure thereto by bolts 52' or the equivalent. I also provide frame bars 53 and 54, suitably secured to the uprights. Bars 46, 50 and 53 form one frame, while bars 47, 51 and 54 form the other.

I have shown in Fig. 20 how the mattress may be clamped between the bars, and in this connection I prefer to provide hooks 55 on the top bar 50 for additional security. I also provide locking means for locking the frames together, the simple construction consisting of the locking members 56, pivotally secured at 57 to the bar 52, and formed with a notch arranged to engage the pin or bolt 58 carried by the bar 51 (Fig. 15).

Figure 16:
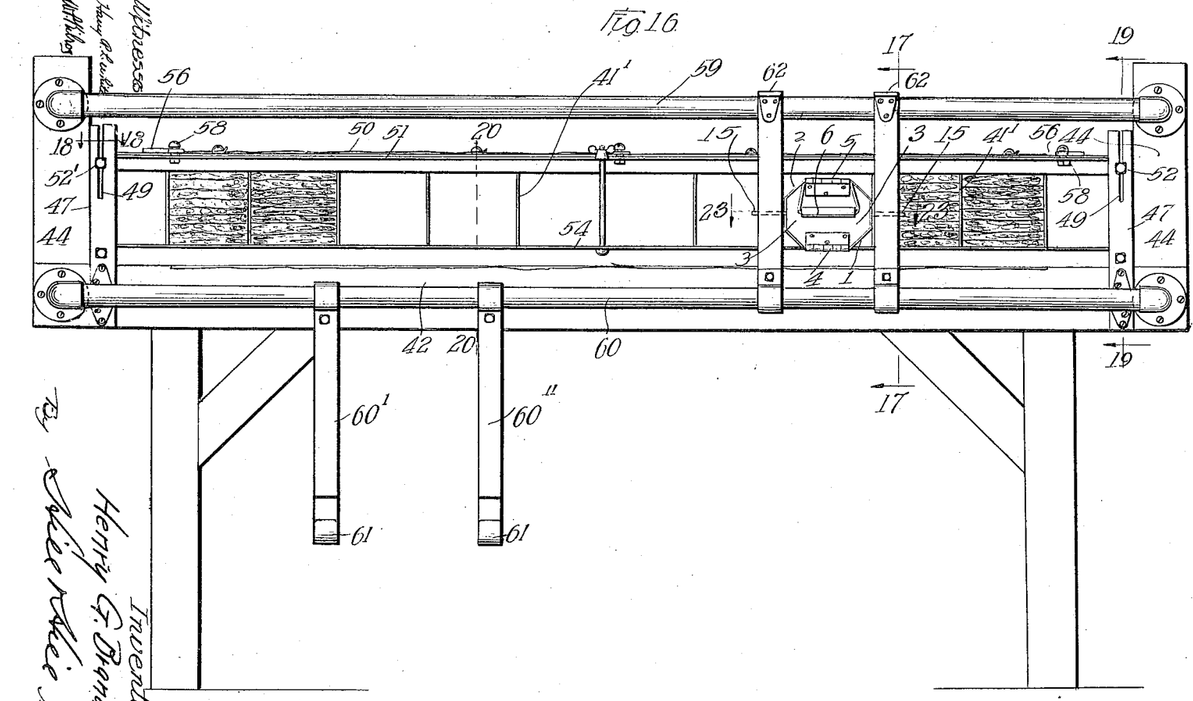
Fig. 16 is a front elevation of the same.
Figures 17, 18:
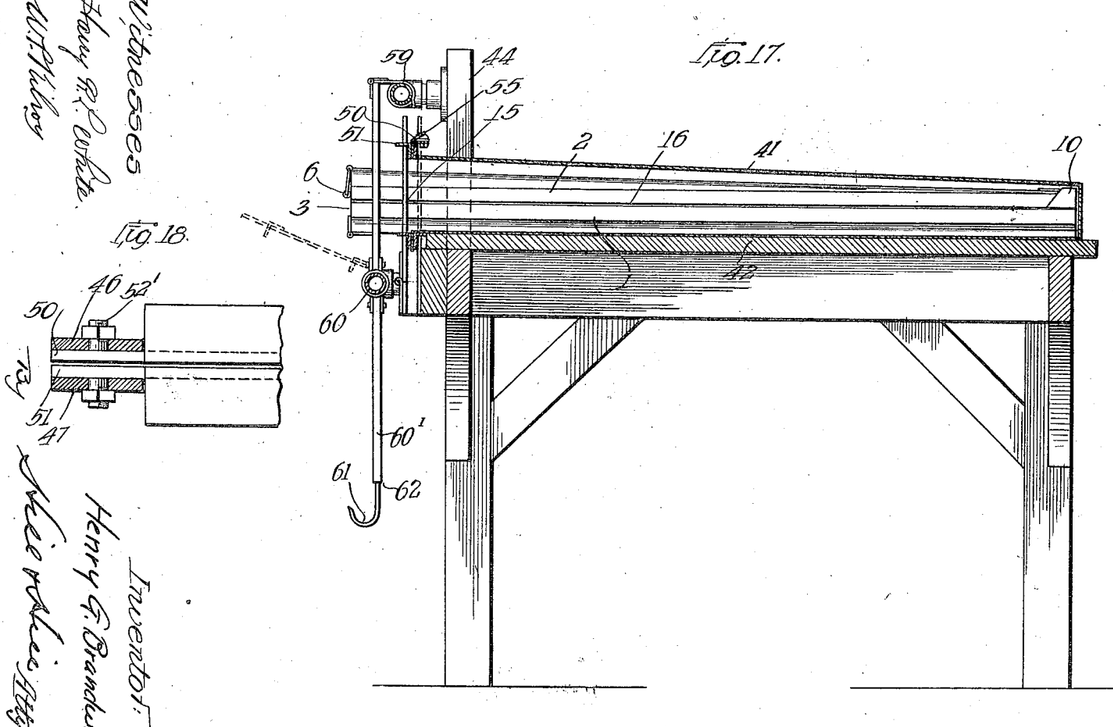
Fig. 17 is a section taken substantially on the line 17—17 of Fig. 16.
Fig. 18 is a section taken substantially on the line 18—18 of Fig. 16.

There is also provided bars 59 and 60, upon which are mounted the desired number of adjustable arms 60'. These arms are pivotally supported on the bar 60 and may be turned up and locked to the bar 59, as shown in Fig. 16. For locks I provide the hook members 61, pivotally secured thereto at 62, as shown in Fig. 17. The purpose of the members 60' is to engage the plunger plate handles or arms 15 when the mold is inserted in the mattress, so that when the mold is withdrawn the plunger is retained stationary, cooperating with the sticks or rods as previously described, the friction of the material on the tick causing the filling to remain in the mattress when the mold is taken out.

The operation of using the filling table may briefly be described as follows:

The mold, having been previously filled and locked as previously described, is inserted in the mattress. Arms 60' are then locked on the bar 59, as mentioned, after which the operator grasps the handle 6 and starts to withdraw the mold. The friction of the mold against the ticking is sufficient to cause part 2 to shift lengthwise relative part 1, thereby unlocking the free ends of the mold so that the same opens up. As the mold is further withdrawn, the plunger and friction between the tick and the released filling causes the filling to remain in the mattress. After the removal of the mold the stick may be removed and the mold is then returned to the mold table and refilled and the operations continued.

Having thus described my invention it is obvious that various immaterial modifications may be made in the same without departing from the spirit of my invention; hence I do not wish to be understood as limiting myself to the exact form construction, arrangement and combination of parts herein shown and described or uses mentioned.

What I claim as new and desire to secure by Letters Patent is:

1. A mold for mattress filling, comprising a plurality of sections permanently interconnected and forming a container, means for locking said sections together as desired, and means for moving said sections longitudinally relatively of one another to unlock said mold.

2. A mold for mattress filling comprising a plurality of sections permanently connected together at one end, means for detachably locking the other end of said sections together, and means for moving said sections longitudinally relatively of one another when locked, for unlocking said sections.

3. A mold for mattress filling comprising a plurality of sections adjustably connected together at one end to form a container, means for detachably locking the other free ends of said sections together for insertion within a mattress, and means for sliding said sections longitudinally relatively of one another when locked to unlock said detachably locked ends.

4. A mold for mattress filling, comprising a plurality of sections permanently hinged together at one end to form a container when closed and means for detachably locking the other end of said sections longitudinally movable relatively of one another about their hinged ends, whereby they may be locked or unlocked at will.

5. A mold for mattress filling, comprising a plurality of sections forming an elongated container, means for detachably locking said sections together for insertion within a mattress, said sections movable longitudinally relatively of one another for locking or unlocking said sections, and means for limiting said longitudinal movement.

6. A mold for mattress filling comprising a top and bottom section, an end section hinged to both said sections, the other end of said container being open, means for detachably locking the open ends of said sections together, and means for moving said closed end about its hinged edges to slide said sections longitudinally of one another.

7. A mold for mattress filling comprising a top and bottom section, an end section hinged to both said sections, the other end of said container being open, means for detachably locking the open ends of said sections together, means for moving said closed end about its hinged edges to slide said sections longitudinally of one another, and means for limiting the movement of said end.

8. A mold for mattress filling comprising a plurality of sections permanently connected together at one end, means for detachably locking the other ends of said section together for insertion within a mattress, means for moving said sections longitudinally of one another when locked, and a movable plunger arranged within said container.

9. A mold for mattress filling comprising a plurality of sections permanently connected together at one end, means for detachably locking the other ends of said sections together for insertion within a mattress, means for moving said sections longitudinally of one another when locked, and a plunger adapted to be positioned within said sections at the connected end and having means projecting therefrom and slidable longitudinally of said sections, said last mentioned means engageable to move said plunger.

10. In a device of the kind described and in combination, a table adapted to support a sectional mold thereon, and means engageable with the mold for moving said sections relatively of one another for locking said sections together after filling.

11. In a device of the kind described and in combination, a table adapted to support a sectional mold thereon, and cam means carried on said table engageable with said sections to move one of said sections relatively to the other for closing said mold when filled.

12. In a device of the kind described and in combination, a table having side boards thereon and adapted to support a sectional mold in place between said boards, and means carried by said table and engageable with said mold for locking the sections together when filled.

13. In a device of the kind described and in combination, a table comprising a portion having side boards adapted to support a sectional mold therebetween, said side boards having overhanging shoulders adapted to bear on the top of the mold, and means carried by said table and engageable with the mold for closing the sections when filled.

14. In a device of the kind described and in combination, a table comprising a portion having side boards arranged laterally adjustable thereon and adapted to support a mold between said boards, and means on said table engageable with the sections of the mold for locking them together when filled.

15. In a device of the kind described and in combination, a table comprising a portion having side boards thereon adapted to support a mold therebetween, means between said boards and table for maintaining said boards in their upright or dropped position, as desired, and means on said table movable into engagement with said mold for closing it and compressing the filling when the mold is filled.

16. In a device of the kind described and in combination, a table comprising a portion having side boards arranged parallel thereon to support a mold therebetween, one of said boards being fixed to the table and the other hinged thereto so that it may be dropped thereon, means for adjustably securing said last-mentioned board to the table so as to vary the spacing between said boards and means on said table engageable with said mold for locking it when filled.

17. In a device of the kind described and in combination, a table comprising a portion having side boards arranged parallel thereon to support a mold therebetween, one of said boards being fixed to the table and the other hinged thereto so that it may be dropped thereon, means for adjustably securing said last-mentioned board to the table so as to vary the spacing between said boards, means for adjustably bracing said hinged board, and means on said table engageable with said mold for locking it when filled.

18. In a device of the kind described and in combination, a table comprising a portion adapted to support a sectional mold thereon, and a cam lever carried by said table and engageable with the end of one of said sections for moving it forwardly of the other section into self-locking position when filled.

19. In combination, a mold for filling mattresses, and a stiffener stick therefor, comprising a bar to be inserted within said mold and having means to engage the filling material therein when moved in one direction and collapsible when retracted from said mold.

20. A stick for filling mattresses comprising a bar adapted to be inserted within the mattress, and laterally extending members carried thereby on opposite sides at spaced intervals, adapted to engage the filling material of the mattress in the forward movement of the bar and collapse against said bar when the bar is retracted from the mattress.

21. A mold stick for filling mattresses comprising a bar adapted to be inserted with the mold within the mattress, and laterally-extending members hingedly carried thereby to extend in opposite directions at spaced intervals adapted to engage the filling material during insertion and collapse against said bar when the bar is retracted from the mold.

22. In combination, a mold for filling mattresses, and a stick comprising a bar adapted to be inserted within said mold, and laterally extending members hinged to said bar on axes transversely of its length at spaced intervals so as to be moved to lie thereagainst when said bar is moved longitudinally through the filling material of the mold in one direction, and to extend outwardly when moved through the filling material in the opposite direction.

23. A table for filling mattresses, comprising a bar arranged across the front edge of said table thereabove, sharpened pins spaced along said bar and detachably engageable with the edges of the mattress at the open side, means cooperable with said bar and the edge of said table to clamp the edges of a mattress therebetween in open position, and means on said table engageable with a locked filled mold inserted into the mattress to maintain the filling material stationary while unlocking the mold, whereby the mold may be withdrawn, leaving the filling material behind.

24. The method of filling mattresses, comprising compressing the filling material to a predetermined size and shape, stiffening the charge lengthwise, completely inserting the charge within the mattress, and holding said charge in place while withdrawing the mold from one end and then withdrawing said stiffening means.

In testimony whereof, I have hereunto signed my name in the presence of two subscribing witnesses.

HENRY G. BRANDWEIN.

Witnesses:
ROY W. HILL,
M. N. NELSON.